United States Patent
Bao et al.

(10) Patent No.: US 11,997,470 B2
(45) Date of Patent: May 28, 2024

(54) METHOD AND APPARATUS FOR PROCESSING SOUND EFFECT

(71) Applicant: SAMSUNG ELECTRONICS CO., LTD., Suwon-si (KR)

(72) Inventors: Junyan Bao, Jiangsu (CN); Weiyi Gu, Jiangsu (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/468,072

(22) Filed: Sep. 7, 2021

(65) Prior Publication Data

US 2022/0078572 A1 Mar. 10, 2022

(30) Foreign Application Priority Data

Sep. 7, 2020 (CN) .......................... 202010926470.6
Sep. 3, 2021 (KR) ........................ 10-2021-0117937

(51) Int. Cl.
*H04S 7/00* (2006.01)
*A63F 13/54* (2014.01)

(52) U.S. Cl.
CPC .............. *H04S 7/302* (2013.01); *A63F 13/54* (2014.09); *A63F 2300/6081* (2013.01)

(58) Field of Classification Search
CPC ... H04S 7/302; A63F 13/54; A63F 2300/6081
USPC ......................................................... 381/303
See application file for complete search history.

(56) References Cited

U.S. PATENT DOCUMENTS 10,225,656 B1 * 3/2019 Kratz ....................... G06F 3/011
2014/0321680 A1 * 10/2014 Takahashi ............... H04S 7/302
381/303

* cited by examiner

*Primary Examiner* — Paul Kim
(74) *Attorney, Agent, or Firm* — Sughrue Mion, PLLC (57) ABSTRACT

A method for processing a sound effect is provided. The method includes obtaining relative orientation information of a first electronic device worn by a first user relative to at least one sound source object in a preset virtual environment, obtaining a processed sound source signal by performing sound effect processing on a sound source signal of the at least one sound source object based on the relative orientation information, and providing the processed sound source signal to the first user through the first electronic device.

19 Claims, 7 Drawing Sheets

METHOD AND APPARATUS FOR PROCESSING SOUND EFFECT

CROSS-REFERENCE TO RELATED APPLICATION(S)

This application is based on and claims priority under 35 U.S.C. § 119(a) to Chinese Patent Application No. 202010926470.6, filed on Sep. 7, 2020, in the Chinese Intellectual Property Office, and to Korean Patent Application No. 10-2021-0117937, filed on Sep. 3, 2021, in the Korean Intellectual Property Office, the disclosures of each are incorporated by reference therein in their entireties.

BACKGROUND

1. Field

The disclosure generally relates to the field of virtual reality (VR) or augmented reality (AR) technology as well as the field of audio processing, and, in particular, to a method and apparatus for processing a sound effect.

2. Description of Related Art

VR may refer to the technology of providing, by comprehensively using a computer graphics system and various interface devices such as reality and control interface devices, an immersive sense in an interactive three-dimensional environment generated on a computer. Currently, the VR technology is widely promoted and applied in games, and involved in games such as a shooting game, a puzzle solving game and a role playing game.

In an existing VR or AR scene, the visual simulation may be implemented through AR devices such as head mounted display (HMD), but the sound in the VR scene is generally realized in a form of external playback. For example, when a user wears an HMD that provides an AR service, an object that the user visually recognizes may be divided into a virtual object and a real physical object. In this case, the sound generated by the virtual object may be relatively realistically provided to the user through the audio output unit included in the HMD, but the sound generated by the actual physical object may not correspond to the visual simulation provided to the user, and the realism may be reduced.

In addition, when sound is reproduced only through the AR device, immersive sound cannot be provided to the user unless the sound provided changes when the user's location or facing direction changes. As such, in the AR environment, although the visual simulation and the sound may be provided in an integrated form to some extent, the immersive experience of the user may not be good.

In order to improve the user's immersion in the AR environment, a technology capable of providing realistic sound effects in the AR environment is required.

SUMMARY

Provided are a method and apparatus for processing a sound effect, a device for running the method and a storage medium.

Additional aspects will be set forth in part in the description which follows and, in part, will be apparent from the description, or may be learned by practice of the presented embodiments.

In accordance with an aspect of the disclosure, a method for processing a sound effect may include obtaining relative orientation information of a first electronic device worn by a first user relative to at least one sound source object in a preset virtual environment, obtaining a processed sound source signal by performing sound effect processing on a sound source signal of the at least one sound source object based on the relative orientation information, and providing the processed sound source signal to the first user through the first electronic device.

In accordance with an aspect of the disclosure, an apparatus for processing a sound effect may include an acquiring module configured to obtain relative orientation information relative to at least one sound source object in a preset virtual environment, a processing module configured to obtain a processed sound source signal by performing sound effect processing on a sound source signal of the at least one sound source object based on the relative orientation information, and a providing module configured to provide the processed sound source signal to a first user wearing the apparatus.

In accordance with an aspect of the disclosure, a computing device may include at least one processor and a memory storing instructions that, when executed, cause the at least one processor to obtain relative orientation information of a first electronic device worn by a first user relative to at least one sound source object in a preset virtual environment, obtain a processed sound source signal by performing sound effect processing on a sound source signal of the at least one sound source object based on the relative orientation information, and provide the processed sound source signal to the first user through the first electronic device.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Exemplary embodiments of the present disclosure are explained below in combination with the accompanying drawings, and various details of the embodiments of the present disclosure are included in the explanation to facilitate understanding, and should be regarded as merely exemplary. Therefore, it should be recognized by those of ordinary skill in the art that various changes and modifications may be made to the embodiments described herein without departing from the scope and spirit of the present disclosure. Likewise, for clarity and conciseness, descriptions for well-known functions and structures are omitted in the following description.

The singular expression may include the plural expression unless the context clearly dictates otherwise. Terms used herein, including technical or scientific terms, may have the same meanings as commonly understood by one of ordinary skill in the art described herein.

In the present disclosure, when a part "includes" a certain component, it means that other components may be further included, rather than excluding other components, unless otherwise stated. In addition, terms such as "~ unit" and "~ module" described in this specification may refer to a unit that processes at least one function or operation, which may be implemented as hardware or software, or a combination of hardware and software.

Throughout the specification, when a part is "connected" with another part, this includes not only the case of being "directly connected" but also the case of being "electrically connected" with another element interposed there between.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
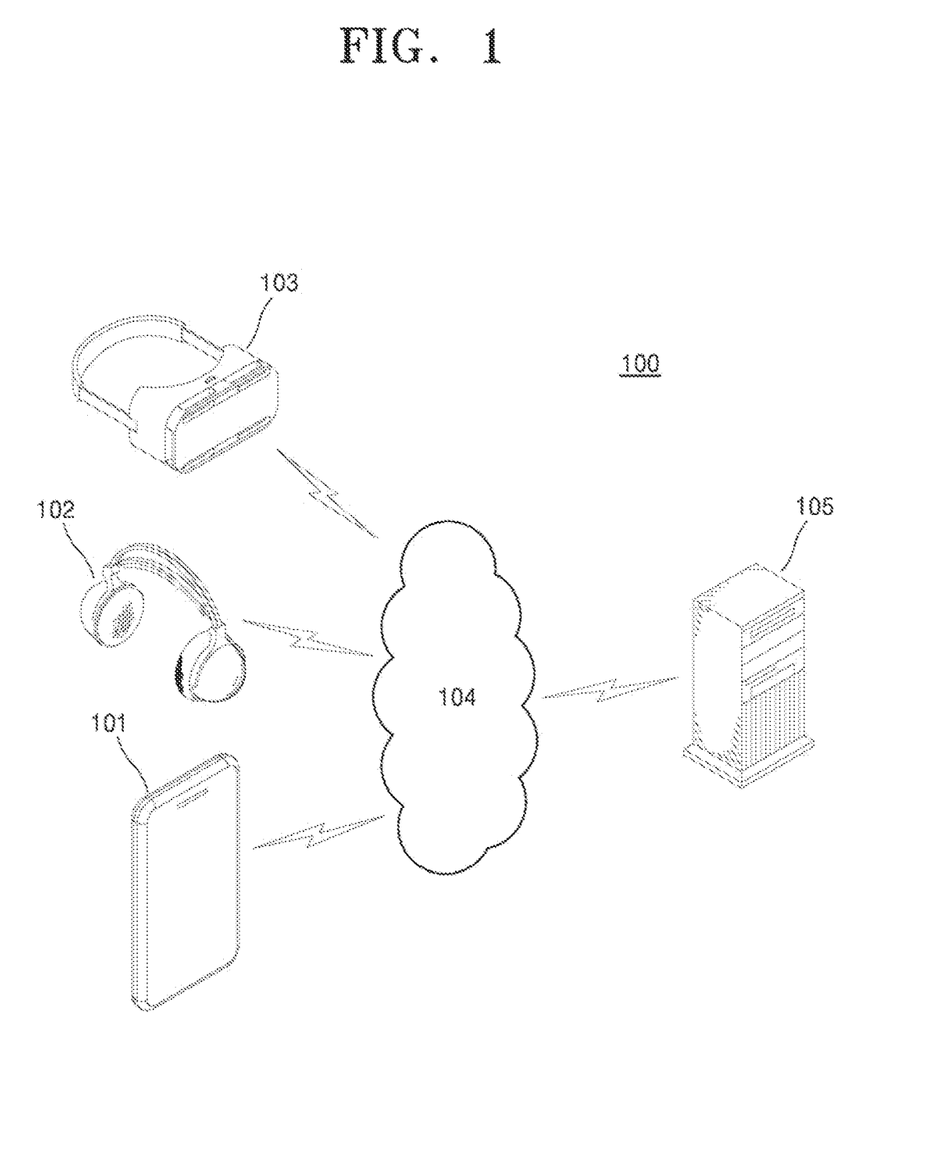
FIG. 1 is a diagram of an exemplary system architecture according to an embodiment.

FIG. 1 is a diagram of an exemplary system architecture according to an embodiment.

As shown in FIG. 1, the system architecture 100 may include terminal devices 101, 102 and 103, a network 104, and a server 105. The network 104 serves as a medium providing a communication link between the terminal devices 101, 102 and 103 and the server 105. The network 104 may include various types of connections, such as wired or wireless communication links, or optical fiber cables.

A user may use the terminal devices 101, 102 and 103 to interact with the server 105 via the network 104 to receive or send messages. Various applications having a positioning function, (e.g., a global positioning system (GPS) positioning application and a Bluetooth positioning application) may be installed on the terminal devices 101, 102 and 103.

The terminal devices 101, 102 and 103 may be hardware or software. When being the hardware, the terminal devices 101, 102 and 103 may be various electronic devices having a positioning function, which include, but not limited to, a wireless headset 102, a mobile phone 101 and an HMD 103 having a positioning function. When being the software, the terminal devices 101, 102 and 103 may be installed in the above listed electronic devices (e.g., mobile phone, wireless headset, wireless earphone, HMD, etc.). The terminal devices may be implemented as a plurality of pieces of software or a plurality of software modules (e.g., software or software modules for providing a sound effect processing service), or as a single piece of software or a single software module.

The terminal device may include an AR device. The AR device is a device capable of expressing AR, and may display an image including a physical object existing in reality and a virtual object.

The HMD-type AR device includes AR glasses in the form of glasses worn by a user on the face, an HMD worn on the head, a VR headset (VRH), or an AR helmet. Meanwhile, the head mounted device of the present disclosure is not limited to the above-described example, and may include various types of devices that provide a VR service or an AR service to a user.

The server 105 may be a server providing various services, such as a server obtaining relative orientation information of the terminal devices 101, 102 and 103 relative to at least one other sound source object, performing sound effect processing on a sound source signal of each other sound source object based on the relative orientation information, and providing the processed sound source signal to the user.

The method for processing a sound effect provided by the embodiments of the present disclosure may be generally performed by the server 105. Correspondingly, an apparatus for processing a sound effect may be generally provided in the server 105.

A sound effect processing application may also be installed on the terminal devices 101, 102 and 103, and the terminal devices 101, 102 and 103 may also perform the sound effect processing based on the relative orientation information. The method for processing a sound effect may also be performed by the terminal devices 101, 102 and 103, and correspondingly, the apparatus for processing a sound effect may also be provided in the terminal devices 101, 102 and 103. The exemplary system architecture 100 may also not include the server 105 and the network 104.

The server 105 may be hardware or software. When being the hardware, the server 105 may be implemented as a distributed server cluster composed of a plurality of servers, or as a single server. When being the software, the server 105 may be implemented as a plurality of pieces of software or a plurality of software modules (e.g., software or software modules for providing a sound effect processing service), or as a single piece of software or a single software module.

The numbers of the terminal devices 101, 102 and 103, the networks 104, and the servers 105 in FIG. 1 are merely illustrative. Any number of terminal devices 101, 102 and 103, networks 104, and servers 105 may be provided based on actual requirements.

Figure 2:
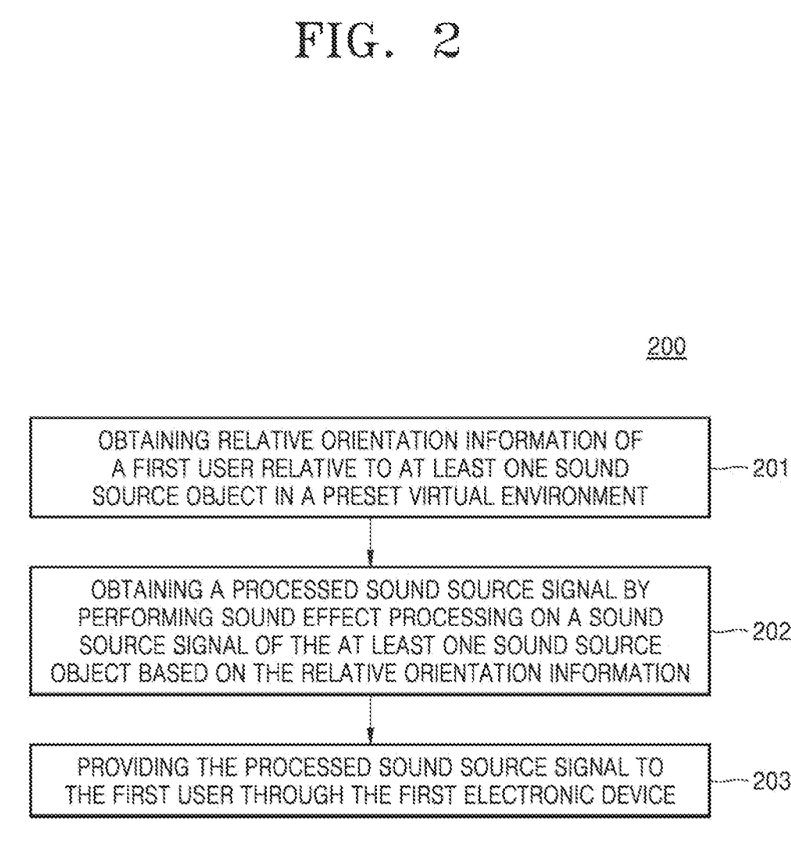
FIG. 2 is a flowchart of a method for processing a sound effect according to an embodiment.

FIG. 2 is a flowchart of a method for processing a sound effect according to an embodiment. The sound effect processing method 200 according to an embodiment of the present disclosure may be performed by an executing entity. The executing entity may be a wearable device worn by a user. In this case, the executing entity may perform the sound effect processing method in a state worn by the user, and provide the processed sound as a result of the execution to the user wearing the executing entity. In one embodiment, the executing entity may be a computing device, such as a server. In this case, the executing entity receives various information required for sound effect processing from electronic device (such as a terminal device, wearable device) worn by the user, performs sound effect processing based on the received information, and then as a result of the execution, transmit the processed sound to the electronic device worn by the user and provide the processed sound to the user through the electronic device. For example, the executing entity performing the sound effect processing method 200 of FIG. 2 may correspond to the terminal devices 101, 102, 103 or the server 105 of FIG. 1, a sound effect processing apparatus 600 of FIG. 6, or an electronic device 700 of FIG. 7. The method 200 for processing a sound effect includes the following operations.

In operation 201, an executing entity, such as an electronic device and sound effect processing device, obtains relative orientation information of a user relative to at least one other sound source object in a preset virtual environment. The relative orientation information of the user relative to the at least one other sound source object may be relative orientation information of the electronic device worn by the user with respect to the at least one sound source object. The relative orientation information may be determined according to a relative orientation that the electronic device worn by the user has with respect to at least one other sound source object.

In an embodiment, an executing entity, such as an electronic device, an apparatus for sound effect processing, and a computing device, may obtain the relative orientation information of the user relative to one or more other sound source objects in the preset virtual environment. The relative orientation information may refer to relative position information of the user relative to the other sound source objects, facing direction information of the user relative to the other sound source objects, facing direction information of the other sound source object relative to the user, or position information and the facing direction information of the user relative to the other sound source objects.

A sound source object may be a physical sound source object existing in a real physical environment corresponding to the preset virtual environment, or virtual sound source object in the preset virtual environment. The sound source object may be another user in the virtual environment. When the sound source object is a virtual sound source object (e.g., a virtual object), orientation information of the virtual sound source object may be predetermined when the virtual sound source object is created. When the sound source object is another user in the preset virtual environment, the relative orientation information may indicate the relative orientation information between the first electronic device worn by the current user (i.e., the first user) and the second electronic device worn by the user (i.e., the second user).

In addition, there may be various ways by which the executing entity obtains the relative orientation information. For example, the executing entity may obtain relative orientation information of the user relative to all sound source objects in the virtual environment, or may directly obtain relative orientation information of the user relative to a sound source object satisfying a preset condition in the virtual environment. The preset condition may be ascertained according to experience, actual requirements, and specific application scenarios.

The sound source object may include the user. The executing entity may also ascertain whether to obtain only relative orientation information of the user relative to another user satisfying the preset condition, by setting a sound source signal acquisition mode. The sound source signal acquisition mode may include an open mode, a privacy mode, etc. If the sound source signal acquisition mode refers to the open mode, the executing entity may obtain relative orientation information of the user relative to all other users, and then process the sound source signals of the users and provide the processed sound source signals to the user. If the acquisition mode refers to the privacy mode, the executing entity only obtains the relative orientation information of the user relative to the user satisfying the preset conditions.

The executing entity may directly obtain the relative orientation information of the user relative to the other sound source object, or may obtain orientation information of the user and the other sound source object in a preset coordinate system, respectively, and ascertain the relative orientation information according to the orientation information of the user and the other sound source object.

Since a VR environment is generally a fixed space, the executing entity may create a rectangular coordinate system according to the fixed space. The origin point of the rectangular coordinate system may be set according to experience, specific application scenarios and actual requirements. For example, if the VR environment refers to a room, a corner point of the room may be used as the origin point.

Further, the executing entity may obtain the orientation information of the user in a preset rectangular coordinate system and the orientation information of a sound source object. The orientation information may include the position information and the facing direction information of the sound source object in the preset rectangular coordinate system. According to the orientation information of the user and the orientation information of the other sound source object, the executing entity may ascertain the relative orientation information of the user relative to the at least one other sound source object in the preset rectangular coordinate system.

The orientation information of the user in the preset rectangular coordinate system may be obtained by using a positioning device in a technology existing or developed in the future, such as a Bluetooth earphone, a wireless headset, an HMD, and smart glasses having a positioning function.

In an embodiment of the disclosure, the executing entity may ascertain the orientation information of the user in the preset rectangular coordinate system by sending a direction finding signal and a positioning signal to the positioning device such as wireless earphone worn by the user.

In addition, the orientation information of a virtual sound source object in the virtual environment may be orientation information preset manually.

In some alternative implementations, the obtaining includes obtaining relative orientation information of the user relative to at least one other user satisfying the preset condition in the preset virtual environment.

In this implementation, in addition to the current user, there is another user using another electronic device in the virtual environment experienced by a current user using an executing entity. The executing entity may obtain relative orientation information of the current user relative to at least one other user. The executing entity worn by the current user may obtain relative orientation information of the current user relative to the user through signal exchange with another electronic device worn by the user.

In an embodiment of the disclosure, by transmitting/receiving a signal to and from a first electronic device worn by a current user to be provided with a processed sound effect and transmitting/receiving a signal to and from a second electronic device worn by another user corresponding to the sound source object, a computing device such as a server that performs the sound effect processing method may obtain relative orientation information of the current user with respect to the user, and may perform sound effect processing.

The executing entity may obtain only the relative orientation information of the current user relative to the at least one other user satisfying the preset condition. The preset condition may refer to that the facing direction of the user is towards the current user. Whether the facing direction of the user is facing the current user may indicate whether the facing direction of the second electronic device worn by the user is facing the first electronic device worn by the current user. That is, the executing entity obtains only the relative orientation information of the current user relative to the user facing towards the current user.

The facing direction of the current user may be towards any direction.

There may be various ways in which the executing entity determines whether the facing direction of the user is towards the current user.

Figure 3:
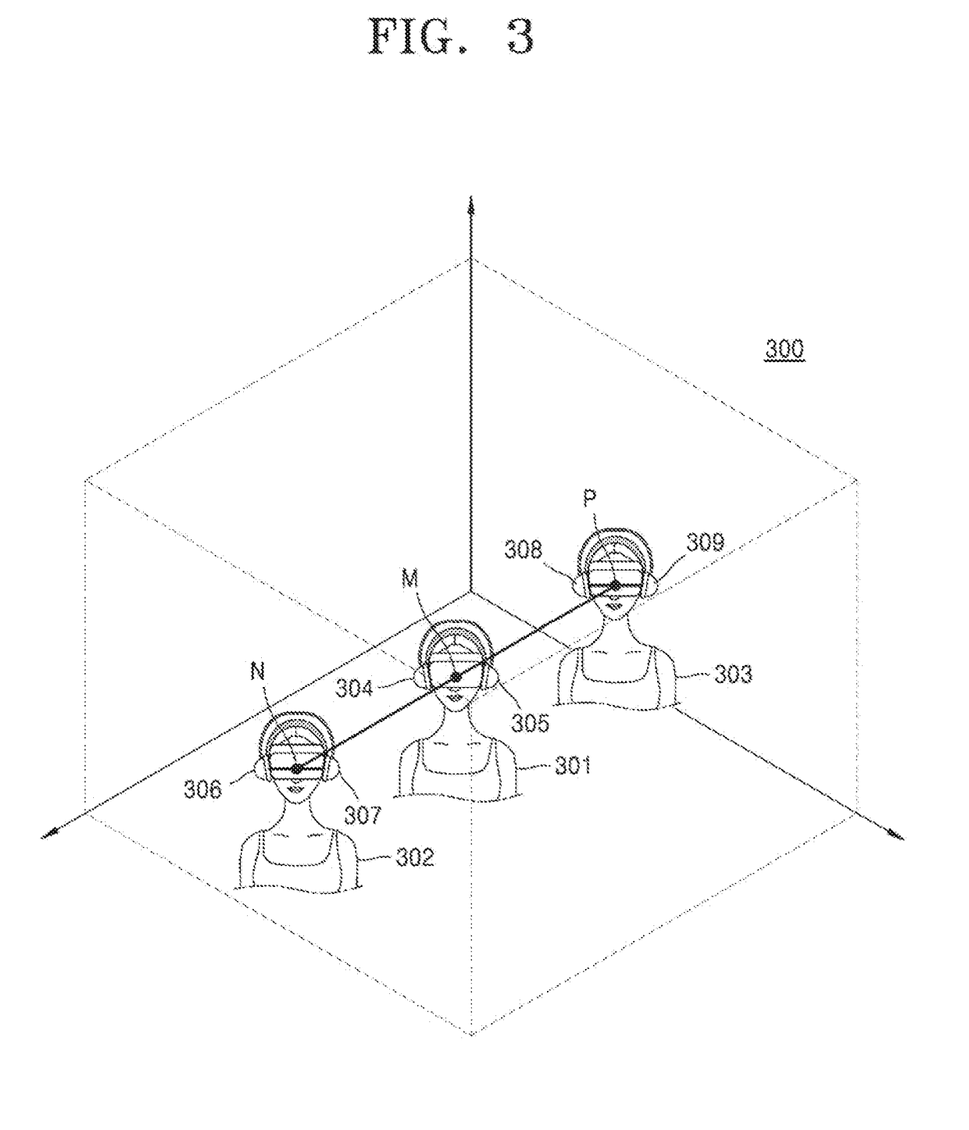
FIG. 3 is a diagram of processing a sound effect according to an embodiment.

FIG. 3 is a diagram of processing a sound effect according to an embodiment. As shown in FIG. 3, the virtual environment 300 includes a user A 301, a user B 302 and a user C 303, and the user A 301, the user B 302 and the user C 303 are each wearing electronic device, such as wireless head-sets, for positioning. The electronic device worn by the current user A 301 may be represented as an executing entity. For example, the executing entity used by the current user A 301 and the electronic devices used by user B 302 and user C 303 of FIG. 3 may each correspond to: the terminal devices 101, 102, and 103 of FIG. 1, the executing entity of FIG. 2, the sound effect processing device 600 of FIG. 6, or the electronic device 700 of FIG. 7.

The executing entity and the electronic device, such as HMD or wireless headset, worn by the user A 301, the user B 302, and the user C 303 respectively includes a right-ear position recognition unit that determines coordinates of a corresponding user's right ear and a left-ear position recognition unit that determines coordinates of the corresponding user's left ear.

First, the executing entity worn by the user A 301 may ascertain the coordinates of the position M the midpoint of the connection line between the right-ear 304 and the left-ear 305 of the user A 301 according to the coordinates of the right-ear 304 and the left-ear 305. Similarly, the electronic device worn by the user B 302 may ascertain the coordinates of the position N the midpoint of the connection line between the right-ear 306 and the left-ear 307 of the user B 302 according to the coordinates of the right-ear 306 and the left-ear 307, and the electronic device worn by the user C 303 may ascertain the coordinates of the position P the midpoint of the connection line between the right-ear 308 and the left-ear 309 of the user C 303 according to the coordinates of the right-ear 308 and the left-ear 309. Then, the executing entity worn by the user A 301 further determines the facing directions of the user B 302 and the user C 303 relative to the user A 301.

The executing entity worn by the user A 301 may calculate the difference value between 90° and the angle between the connection line MN and a further connection line to determine whether the difference value is equal to or less than a preset angle value, (e.g., about 10°), where the further connection line refers to the line for connecting the coordinates of the right-ear 306 of the user B 302 and the coordinates of the left-ear 307. If the difference value is equal to or less than 10°, it is ascertained that the facing direction of the user B 302 is towards the user A 301.

Further, the executing entity worn by the user A 301 may determine whether the facing direction of the user C 303 is towards the user A 301 using the above way. If the difference value between the angle between the connection line MP and the connection line for connecting the right-ear 308 of the user C 303 and the left-ear 309 and 90° is greater than 10°, it is ascertained that the facing direction of the user C 303 does not face towards the user A 301.

In an embodiment of the disclosure, the condition for user A 301 to receive a sound source signal from a sound source object (e.g., another user B 302 or C 303) may be set according to whether the sound source object generates a sound source signal toward the user A 301, regardless of the distance between the user A 301 and the sound source objects. For example, a condition for user A 301 to receive a sound source signal from another user B 302 or C 303 in the virtual environment 300, may be set such that the facing direction of the user is toward user A 301. Referring back to FIG. 3, although the user C 303 is closer to the user A 301, if the facing direction of the user C 303 does not face towards the user A 301, the user C 303 does not satisfy the preset condition, and thus, the sound source signal of the user C 303 after sound effect processing cannot be received by the user A 301.

According to this implementation, the relative orientation information of the user relative to the at least one other user satisfying the preset condition in the preset virtual environment is obtained. In this way, the user acquires the pertinence of the sound source signal, and the reliability and efficiency of the acquisition of the sound source signal are improved.

Meanwhile, in FIG. 3, a case in which the sound effect processing method according to an embodiment of the present disclosure is directly performed on the executing entity worn by the user A 301 to be provided with the processed sound is shown, but according to the present disclosure the sound effect processing method may be performed in other electronic devices which are not worn by user A 301. For example, the computing device performing sound effect processing, such as server, may be configured to receive orientation information from other electronic devices worn by users A 301, B 302, and C 303 and sound source objects in the virtual environment 300, respectively, perform sound effect processing, and transmit the processed sound to the electronic device worn by the user A 301.

Referring back to FIG. 2, in operation 202, an executing entity obtains the processed sound source signal by performing sound effect processing on a sound source signal of each other sound source object based on the relative orientation information.

In this embodiment, after obtaining the relative orientation information of the user relative to the at least one other sound source object, the executing entity may perform the sound effect processing on the sound source signal in the each other sound source object by using a preset sound effect processing algorithm according to the relative orientation information of the user relative to the each other sound source object, to obtain the processed sound source signal. The processed sound source signal may be used to represent a sound signal of the sound source signal, which reaches both ears of the user (i.e., a binaural signal).

The preset sound effect processing algorithm may include a sound effect processing algorithm in a technology existing or developed in the future, such as a head related transfer function (HRTF) algorithm and a head-related unit impulse response (HRIR)-based synthesis algorithm.

An HRTF is a sound effect positioning algorithm corresponding to an HRIR (Head Related Impulse Response) in the time domain, and the HRIR is the basis in the binaural auditory-based spatial sound image presentation. It assumes that the sound transmission path from a sound source to a human ear is a linear time-invariant system, and thus the sound transmission path may be described using a unit impulse response.

In some alternative implementations, the performing sound effect processing includes calculating respectively a convolution of an HRIR corresponding to each piece of relative orientation information and a sound source signal of a sound source object corresponding to the relative orientation information.

In this implementation, the executing entity may directly calculate the convolution of the HRIR corresponding to the each piece of relative orientation information and the sound source signal of the sound source object corresponding to the relative orientation information, to obtain a binaural signal to present a spatial orientation sense.

Since the HRIR is mainly obtained through an acoustic measurement, a measurement orientation always corresponds to a spatial orientation point and a time sampling with certain accuracy. Therefore, in order to ensure the accuracy of the obtained binaural signal, it is required to measure sufficiently dense spatial orientation points and it is required that the sampling rate is high enough.

According to this implementation, the convolution of the HRIR corresponding to the each piece of relative orientation information and the sound source signal of the sound source object corresponding to the relative orientation information is directly calculated, to obtain the processed sound source signal, thus improving the efficiency of acquiring the signal after the sound effect processing.

In some alternative implementations, the preset virtual environment may include a plurality of sound source objects. The performing sound effect processing may include performing the sound effect processing on the sound source signal of the each sound source object based on the relative orientation information, and superimposing the processed sound source signal of the each sound source object.

In this implementation, if the preset virtual environment includes a plurality of sound source objects, the processed sound source signal may refer to the superimposing of the processed sound source signals of a plurality of sound source objects. Further, the executing entity provides the superimposed sound source signal to the user (i.e., provides the processed sound source signals of the sound source objects to the user at the same time).

According to this implementation, the processed sound source signal of each sound source object is superimposed to obtain a superimposed sound source signal, and the superimposed sound source signal is provided to the user, which improves the authenticity of the sound provided to the user, thus facilitating improving the immersive experience of the user.

In operation 203, an executing entity provides the processed sound source signal to the user.

In this embodiment, the executing entity may respectively provide the processed sound source signal corresponding to at least one sound source object to the user through an audio playback device, or may superimpose the processed sound source signals corresponding to a plurality of sound source objects to provide a superimposed processed sound source signal to the user through the audio playback device.

The audio playback device may be a device in a technology existing or developed in the future that is used for converting a sound source signal into sound, for example, an earphone, a mobile phone, a headset, a speaker in an HMD, and a sound box.

Figure 4:
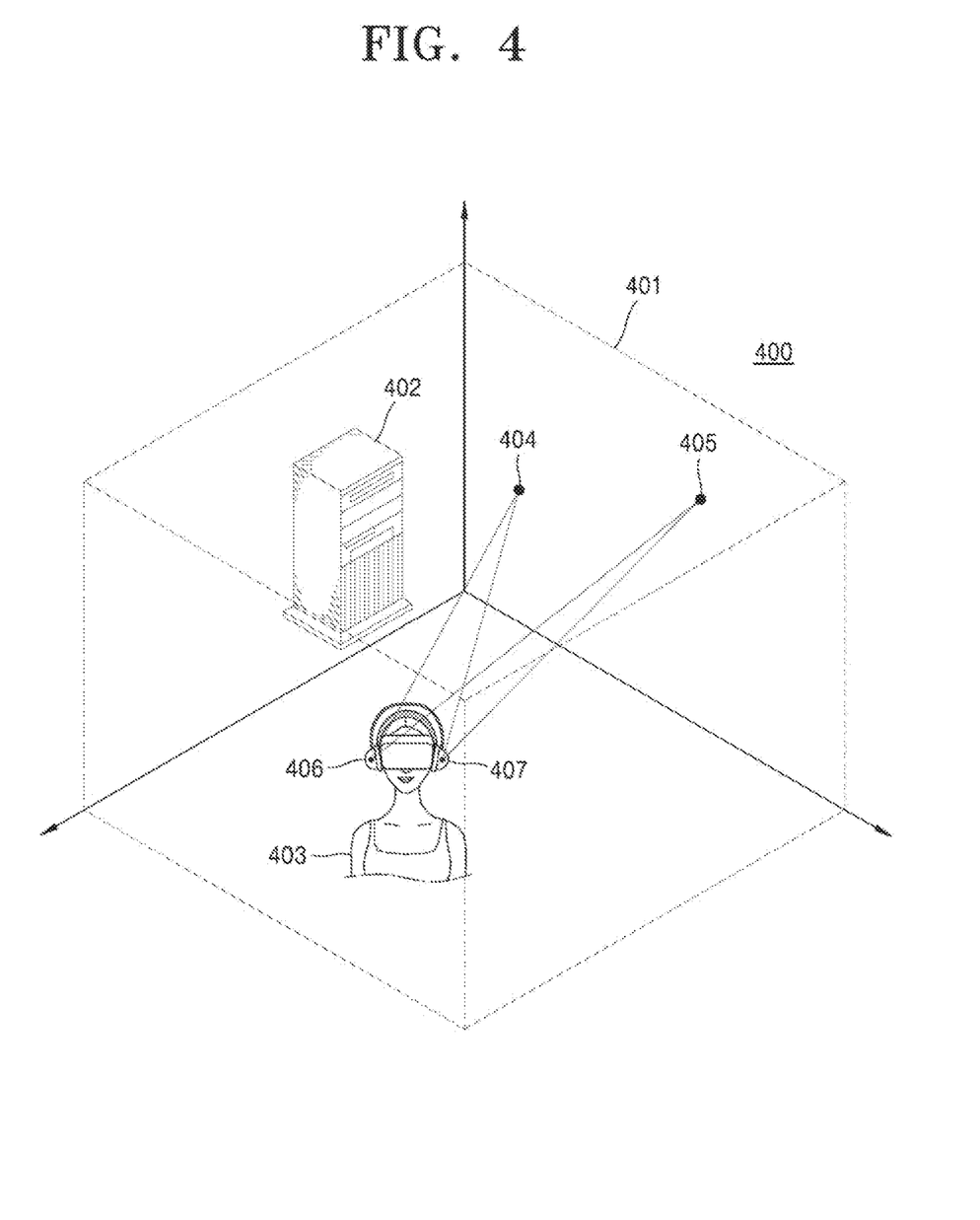
FIG. 4 is a diagram of an application scenario according to an embodiment.

FIG. 4 is a diagram of an application scenario according to an embodiment.

In the application scenario of FIG. 4, in an example, in a preset virtual environment 400, the rectangular coordinate system 401 is provided according to the fixed space corresponding to the virtual environment 400, and the executing entity 402 may set the origin point of the coordinate system 401. The virtual environment 400 may include a user 403, a first sound source object 404 and a second sound source object 405.

Figure 6:
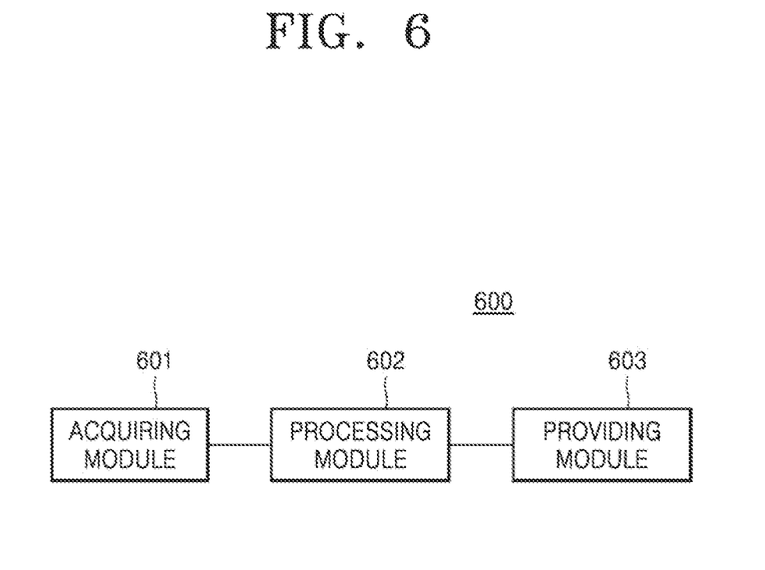
FIG. 6 is a diagram of an apparatus for processing a sound effect according to an embodiment.
Figure 7:
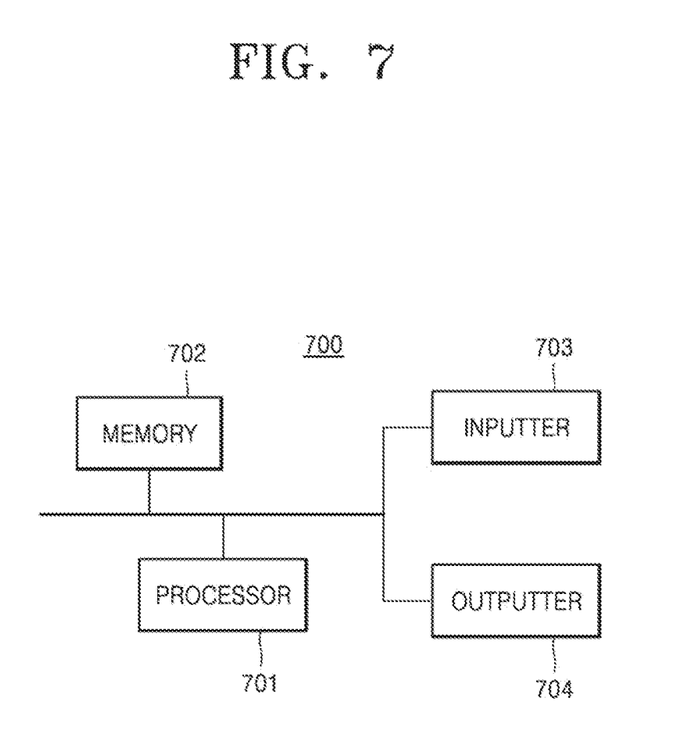
FIG. 7 is a diagram of an electronic device according to an embodiment.

According to FIG. 4, the positioning device worn by the user 403 may correspond to the terminal devices 101, 102, and 103 of FIG. 1, the executing entity of FIG. 2, the sound effect processing device 600 of FIG. 6, or the electronic device 700 of FIG. 7. The server 402 may be represented as an executing entity in FIG. 4. For example, the server 402 may correspond to the server 105 of FIG. 1, the executing entity of FIG. 2, the sound effect processing device 600 of FIG. 6, or the electronic device 700 of FIG. 7.

The executing entity (e.g., the server) 402 may ascertain the orientation information of the user 403 in the rectangular coordinate system 401 through a positioning device worn by the user 403, such as the wireless headset including a right portion 406 and a left portion 407, and obtain the orientation information of the sound source objects 404 and 405, and thus ascertain the orientation information of the user 403 relative to the first sound source object 404 and the orientation information of the user 403 relative to the second sound source object 405. Further, the executing entity 402 respectively performs the sound effect processing on the sound source signal of the first sound source object 404 and the sound source signal of the second sound source object 405 according to the relative position information and the preset sound effect positioning algorithm, to obtain the sound source signals after the sound effect processing. Finally, the sound source signals after the sound effect processing are provided to the user through the audio playback device, for example, the wireless headset or the wireless earphone.

According to the method for processing a sound effect provided in the embodiment of the present disclosure, the relative orientation information of the user 403 relative to the at least one other sound source object 404 and 405 in the preset virtual environment 400 is obtained, the sound effect processing is performed on the sound source signal of the each other sound source objects 404 and 405 based on the relative orientation information, and the processed sound source signal is provided to the user 403, such that the sound of the sound source objects 404 and 405 in the virtual environment 400 acquired by the user 403 becomes more real, which facilitates improving the immersive experience of the user.

Figure 5:
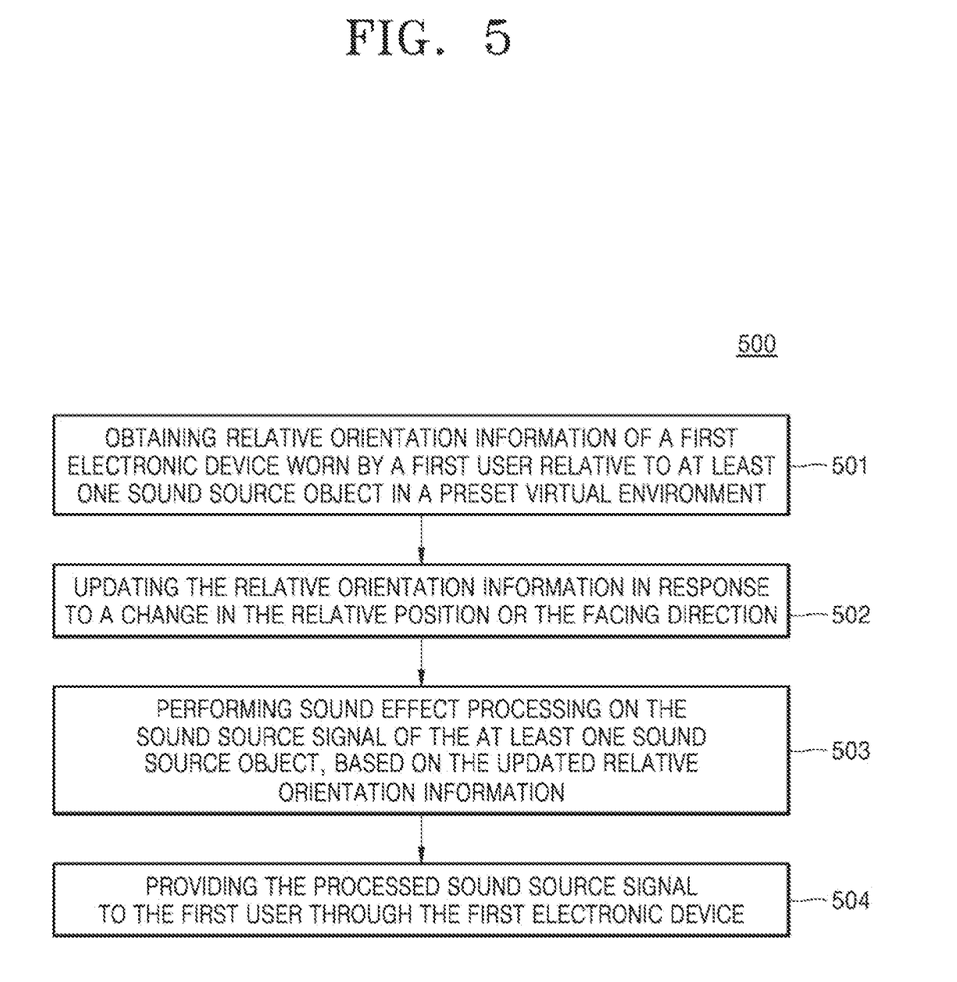
FIG. 5 is a flowchart of a method for processing a sound effect according to an embodiment.

FIG. 5 is a flowchart 500 of a method for processing a sound effect according to an embodiment. In this embodiment, the relative orientation information includes a relative position and a facing direction, and the flow 500 of the method for processing a sound effect in this embodiment may include the following steps. The sound effect processing method 500 according to an embodiment of the present disclosure may be performed by an executing entity. For example, the executing entity of FIG. 5 may correspond to the terminal devices 101, 102, 103, or the server 105 of FIG. 1, the executing entity of FIG. 2, the sound effect processing device 600 of FIG. 6, or the electronic device 700 of FIG. 7.

In operation 501, an executing entity may obtain relative orientation information of a user relative to at least one other sound source object in a preset virtual environment.

In this embodiment, for the implementation details and technical effects of operation 501, reference may be made to the description for operation 201 of FIG. 2.

In operation 502, an executing entity may update the relative orientation information in response to a change in a relative position and/or a facing direction of the user relative to the at least one other sound source object.

In this embodiment, if the position and/or the facing direction of the user relative to the sound source object changes, the executing entity may use the changed position and/or facing direction information of the user relative to the sound source object as the updated relative orientation information.

The change in the position and/or the facing direction of the user relative to the sound source object may be caused by a change in the position and/or the facing direction of the user, or may be caused by a change in the position and/or the facing direction of the sound source object.

As an example, the user may play a shooting game in a virtual environment in which a sound source object A exists. The executing entity first ascertains the relative orientation information according to the orientation information of the user and the orientation information of the sound source object A that are obtained by the positioning device worn by the user. At this time, if the user changes the facing direction and/or leaves from the current position and the orientation information of the sound source object A remains unchanged, the relative orientation information of the user relative to the sound source object A changes, and then, the updated relative orientation information is ascertained according to the orientation information of the sound source object A and the changed orientation information of the user.

As another example, the user may watch a performance in a virtual environment in which a sound source object B exists. During the performance, if the position and the facing direction of the user remain unchanged, and the position and/or the facing direction of the sound source object B changes, the relative orientation information of the user relative to the sound source object B changes, and then, the updated relative orientation information is ascertained according to the orientation information of the user and the changed orientation information of the sound source object B.

In operation 503, an executing entity may perform sound effect processing on a sound source signal of each other sound source object based on the updated relative orientation information.

In this embodiment, after obtaining the updated relative orientation information, the executing entity may perform the sound effect processing on the sound source signal of the each other sound source object by using a preset sound effect processing algorithm according to the updated relative orientation information.

For example, the user is playing a shooting game in a virtual environment in which a sound source object C and a sound source object D exist. The initial position of the user is at the center of the connection line between the sound source object C and the sound source object D, and the facing direction of the user faces towards the sound source object D. If the user leaves from the current position and moves along the connection line between the sound source object C and the sound source object D to a new position closer to the sound source object D, and the facing direction does not change, the executing entity updates the relative orientation information based on the new position of the user to obtain the updated relative orientation information, and further ascertains, according to the updated relative orientation information, the processed sound source signal of the sound source object C and the processed sound source signal of the sound source object D. At this time, since the user is far away from the sound source object C and close to the sound source object D, the sound source signal of the sound source object C after the sound effect processing becomes smaller than the sound source signal heard by the user at the initial position, and the sound source signal of the sound source object D after the sound effect processing becomes larger than the sound source signal heard by the user at the initial position.

In operation 504, an executing entity may provide the processed sound source signal to the user.

In this embodiment, for the implementation details and technical effects of step 504, reference may be made to the description for operation 203 of FIG. 2.

According to the above embodiment of the present disclosure, the relative orientation information is updated in response to the change in the relative position and/or the facing direction of the user relative to the at least one other sound source object, the sound effect processing is performed on the sound source signal of the each other sound source object based on the updated relative orientation information, and the processed sound source signal is provided to the user. In this way, when the user moves the position or changes the facing direction, the sound (e.g., the sound made by a virtual space object) experienced by the user also changes with the change in the position or the facing direction, thus further improving the immersive experience of the user.

Further referring to FIG. 6, as an implementation of the method shown in the above drawings, the present disclosure provides an embodiment of an apparatus 600 for processing a sound effect. The embodiment of the apparatus corresponds to the embodiment of the method shown in FIG. 2, and the apparatus may be applied in various electronic devices. For example, the sound effect processing apparatus 600 of FIG. 6 may correspond to the terminal devices 101, 102, 103 of FIG. 1, the executing entity of FIG. 2, the positioning device of FIG. 4, or the electronic device 700 of FIG. 7, and may perform sound effect processing as a device worn by a user. For example, the sound effect processing apparatus 600 of FIG. 6 may correspond to the server 105 of FIG. 1, the executing entity of FIG. 2, the server 402 of FIG. 4, or the electronic device 700 of FIG. 7, and may perform sound effect processing based on received data from another electronic device worn by the user.

As shown in FIG. 6, the apparatus 600 for processing a sound effect in this embodiment includes an acquiring module 601, a processing module 602 and a providing module 603.

The acquiring module 601 may be configured to obtain relative orientation information of a user relative to at least one other sound source object in a preset virtual environment.

The processing module 602 may be configured to obtain the processed sound source signal used to represent a sound signal of the sound source signal, which reaches an ear of the user, by performing sound effect processing on a sound source signal of each other sound source object based on the relative orientation information.

The providing module 603 may be configured to provide the processed sound source signal to the user.

In some alternative implementations of this embodiment, the relative orientation information includes a relative position and a facing direction. The processing module 602 is further configured to update the relative orientation information in response to a change in the relative position and/or the facing direction of the user relative to the at least one other sound source object; and perform the sound effect processing on the sound source signal of the each other sound source object based on the updated relative orientation information.

In some alternative implementations of this embodiment, the processing module 602 may be further configured to calculate respectively a convolution of an HRIR corresponding to each piece of relative orientation information and a sound source signal of a sound source object corresponding to the relative orientation information.

In some alternative implementations of this embodiment, the sound source object may correspond to more than one sound object. For example, the preset virtual environment may include more than one sound source object. The processing module 602 may be further configured to perform the sound effect processing on the sound source signal of the each sound source object based on the relative orientation information; and superimpose the processed sound source signal of the each sound source object.

In some alternative implementations of this embodiment, the sound source object may include another user. For example, the preset virtual environment may include other user in addition to the present user. The acquiring module 601 may be further configured to obtain relative orientation information of the user relative to at least one other user satisfying a preset condition in the preset virtual environment, the preset condition including: whether the facing direction of the user is towards the user.

According to some embodiments, the present disclosure further provides an electronic device and a computer readable storage medium.

FIG. 7 is a diagram of an electronic device according to an embodiment. For example, the electronic device 700 of FIG. 7 may correspond to the terminal devices 101, 102, 103 of FIG. 1, the executing entity of FIG. 2, the positioning device of FIG. 4, or the sound effect processing apparatus 600 of FIG. 6, and may perform sound effect processing as a device worn by a user. For example, the electronic device 700 of FIG. 7 may correspond to the server 105 of FIG. 1, the executing entity of FIG. 2, the server 402 of FIG. 4, or the sound effect processing apparatus 600 of FIG. 6, and may perform sound effect processing based on received data from another electronic device worn by the user.

The electronic device 700 may represent various forms of digital computers such as a laptop computer, a desktop computer, a workstation, a personal digital assistant, a server, a blade server, a mainframe computer, and other appropriate computers. The electronic device 700 may also represent various forms of mobile apparatuses such as a personal digital processing device, a cellular telephone, a smart phone, a wearable device and other similar computing apparatuses. The parts shown herein, their connections and relationships, and their functions are only as examples, and not intended to limit implementations of the present disclosure as described herein.

As shown in FIG. 7, the electronic device 700 includes one or more processors 701, a storage 702, and an interface for connecting parts, the interface including a high speed interface and a low speed interface. The parts are interconnected using different buses, and may be mounted on a common motherboard or in other ways as needed. The one or more processors 701 may process an instruction executed within the electronic device 700, the instruction including an instruction stored in the storage 702, to display graphical information of a graphical user interface (GUI) on an external input/output apparatus such as a display device coupled to the interface. In other implementations, a plurality of processors and/or a plurality of buses may be used, if desired, along with a plurality of storages 702. Also, a plurality of electronic devices 700 may be connected, and each device provides a portion of necessary operations (e.g., as a server array, a group of blade servers or a multi-processor system). In FIG. 7, one or more processors 701 is taken as an example.

The storage 702 is a non-transitory computer readable storage medium provided in the present disclosure. The storage 702 stores instructions that, when executed, may cause the one or more processors 701 to perform the method for processing a sound effect provided in the present disclosure. The non-transitory computer readable storage medium in the present disclosure stores a computer instruction, the computer instruction being used to cause a computer to perform the method for processing a sound effect provided in the present disclosure.

As the non-transitory computer readable storage medium, the storage 702 may be used to store a non-transitory software program, a non-transitory computer executable program and a module such as a program instruction/module (e.g., the acquiring module 601, the processing module 602 and the providing module 603 shown in FIG. 6) corresponding to the method for processing a sound effect in the embodiments of the present disclosure. The one or more processors 701 execute various functional applications and data processing by running the non-transitory software program, the instruction or the module stored in the storage 702 (i.e., implements the method for processing a sound effect in the above embodiments of the method).

The storage 702 may include a storage program area and a storage data area. The storage program area may store an operating system and an application program required for at least one function. The storage data area may store data, etc. created according to the use of an electronic device of processing a sound effect. In addition, the storage 702 may include a high speed random access memory (RAM), and may also include a non-transitory storage device, such as at least one magnetic disk storage device, a flash storage device, or other non-transitory solid state storage devices. In some embodiments, the storage 702 may alternatively include a storage device disposed remotely relative to the one or more processors 701. The remote storage device may be connected to the electronic device of processing the sound effect via a network. Examples of such network include, but not limited to, the Internet, an enterprise intranet, a local area network, a mobile communication network, and a combination thereof.

The electronic device of the method for processing a sound effect may further include: an inputter 703 (e.g., an input apparatus) and an outputter 704 (e.g., an output apparatus). The one or more processors 701, the storage 702, the inputter 703 and the output apparatus 704 may be connected via a bus or in other ways. In FIG. 7, the connection via a bus is taken as an example.

The inputter 703 may receive various input signal including feedback signal from the user for monitoring a quality of live video streaming. For example, the inputter 703 may include a touch screen, a keypad, a mouse, a track pad, a touch pad, a pointing stick, one or more mouse buttons, a track ball, a joystick, or the like. The outputter 704 may include a display device, an auxiliary lighting apparatus (e.g., a light emitting diode (LED)), a tactile feedback apparatus (e.g., a vibration motor), etc. The display device may include, but not limited to, a liquid crystal display (LCD), an LED display, and a plasma display. In some embodiments, the display device may be a touch screen.

In an embodiment, the electronic device 700 performing the method for processing sound effects according to an embodiment of the present disclosure may be configured as a head mounted device.

The head mounted device may include AR glasses in the form of glasses worn by the user on the face, an HMD worn by the user on the head, a VRH, or an AR helmet. In the case of a head mounted device, by arranging the display in front of the user's eyes, it is possible to provide the user with an extra-large screen, and since the screen moves according to the user's movement, it is possible to provide a realistic virtual environment. In one embodiment, the head mounted device may include a lightweight HMD (e.g., goggles, glasses, visor, etc.). In one embodiment, the head mounted device may include one or more laser projection glasses (e.g., a glasses projecting low-powered laser on the user's retina to provide image or depth content to the user).

In one embodiment, the user may wear a head mounted device, capable of displaying visual AR content. The head mounted device may include an audio module capable of providing audio extended reality content to a user. The audio module may perform the sound effect processing method according to an embodiment of the present disclosure.

In an embodiment, the head mounted device may provide an AR service that outputs at least one virtual object to be overlapped in an area determined by the user's field of view (FOV). For example, the area determined by the user's FOV is an area determined to be recognizable by a user wearing the head mounted device through the head mounted device, and may be an area including all or at least a part of the display of the head mounted device.

In one embodiment, the head mounted device may include a display module, a camera, an audio outputter, and a support.

The camera may capture an image corresponding to the user's FOV or measure the distance to the object. In one embodiment, the camera may be used for head tracking and spatial awareness. In addition, the camera may recognize the user's movement.

The virtual object output through the display module may include information related to an application program executed in the head mounted device or information related to an external object located in a real space corresponding to an area determined by the user's FOV. For example, the head mounted device may identify an external object included in at least a portion corresponding to an area determined by the user's FOV among image information related to a real space acquired through a camera. The head mounted device may output at least a part of the virtual object related to the identified external object through an area determined by the user's FOV among the display areas of the head mounted device. The external object may include an object existing in a real space.

In one embodiment, the display may include a display panel or lens (e.g., glass). For example, the display panel may include a transparent material such as glass or plastic. In an embodiment, the display may be made of a transparent element, and the user may see through the display to perceive the actual space behind the display. The display may display the virtual object on at least a portion of the transparent element so that the user sees the virtual object as being added to at least a portion of the real space.

In an embodiment of the present disclosure, the support may include a printed circuit board (PCB) for transmitting an electrical signal to each component of the head mounted device, a speaker for outputting an audio signal, or a battery for supplying power. For example, in a glasses-type head mounted device, the support part may be disposed on the temple portion. The speaker may include a left-portion for transmitting an audio signal to the user's left ear and a right-portion for transmitting an audio signal to the user's right ear. In an embodiment of the present disclosure, a left-ear position recognition unit for determining coordinates of the left ear may be included in a portion corresponding to the left-portion of the speaker, and a right-ear position recognition unit for determining coordinates of the right ear may be included in a portion corresponding to the right-portion of the speaker.

According to an embodiment of the present disclosure, the head mounted device may measure a distance to an actual physical sound source object located in the front direction of the head mounted device using an outward camera. In this case, the distance between the head mounted device and the sound source object obtained through the outward camera may be used to determine relative orientation information of the user, wearing the head mounted device, relative to the sound source object.

The head mounted device according to an embodiment of the present disclosure is not limited to the above-described configuration, and various components may be included in various numbers at various locations.

Various implementations of the systems and techniques described herein may be implemented in a digital electronic circuit system, an integrated circuit system, an application specific integrated circuit (ASIC), computer hardware, firmware, software, and/or combinations thereof. These various implementations may include the implementation in one or more computer programs. The one or more computer programs may be executed and/or interpreted on a programmable system including at least one programmable processor, and the programmable processor may be a dedicated or general-purpose programmable processor, may receive data and instructions from a storage system, at least one input apparatus and at least one output apparatus, and transmit the data and the instructions to the storage system, the at least one input apparatus and the at least one output apparatus.

Various embodiments of the present disclosure may be implemented or supported by one or more computer programs, which may be formed from computer readable program code and embodied in a computer readable medium. In this disclosure, "application" and "program" refer to one or more computer programs, software components, instruction sets, procedures, functions, objects, class, instance, and related data, suitable for implementation in computer-readable program code. "Computer readable program code" may include various types of computer code including source code, object code, and executable code. "Computer readable medium" may refer to read only memory (ROM), RAM, hard disk drive (HDD), compact disc (CD), digital video disc (DVD), magnetic disk, optical disk, programmable logic device (PLD) or various types of memory, which may include various types of media that can be accessed by a computer.

In addition, the device-readable storage medium may be provided in the form of a non-transitory storage medium. The 'non-transitory storage medium' is a tangible device and may exclude wired, wireless, optical, or other communication links that transmit temporary electrical or other signals. On the other hand, this 'non-transitory storage medium' does not distinguish between a case in which data is semi-permanently stored in a storage medium and a case in which data is temporarily stored. For example, the 'non-transitory storage medium' may include a buffer in which data is temporarily stored. Computer readable media can be any available media that can be accessed by a computer and can include both volatile and nonvolatile media, removable and non-removable media. Computer readable media includes media in which data can be permanently stored and media in which data can be stored and later overwritten, such as a rewritable optical disk or a removable memory device.

According to one embodiment, the method according to various embodiments disclosed in this document may be provided as included in a computer program product. Computer program products may be traded between sellers and buyers as commodities. The computer program product is distributed in the form of a machine-readable storage medium (e.g., CD-ROM), or is distributed between two user devices (e.g., smart phones) directly or through online (e.g., downloaded or uploaded) via an application store. In the case of online distribution, at least a portion of the computer program product (e.g., a downloadable app) may be temporarily stored or created in a device-readable storage medium, such as a memory of a manufacturer's server, a server of an application store, or a relay server.

To provide an interaction with a user, the systems and techniques described here may be implemented on a computer having a display apparatus (e.g., a cathode ray tube (CRT) or an LCD monitor) for displaying information to the user, and a keyboard and a pointing apparatus (e.g., a mouse or a track ball) by which the user may provide the input to the computer. Other kinds of apparatuses may also be used to provide the interaction with the user. For example, a feedback provided to the user may be any form of sensory feedback (e.g., a visual feedback, an auditory feedback, or a tactile feedback); and an input from the user may be received in any form, including acoustic input, speech input, or tactile input.

The systems and techniques described here may be implemented in a computing system (e.g., a data server) that includes a backend part, implemented in a computing system (e.g., an application server) that includes a middleware part, implemented in a computing system (e.g., a user computer having a graphical user interface or a Web browser through which the user may interact with an implementation of the systems and techniques described here) that includes a frontend part, or implemented in a computing system that includes any combination of the backend part, the middleware part or the frontend part. The parts of the system may be interconnected by any form or medium of digital data communication (e.g., a communication network). Examples of the communication network include a local area network (LAN), a wide area network (WAN) and the Internet.

The computer system may include a client and a server. The client and the server are generally remote from each other and typically interact through the communication network. The relationship between the client and the server is generated through computer programs having a client-server relationship to each other and running on the respective computer.

Through an electronic device which does not perform the sound effect processing, the user hears the same sound output despite the change in the user's relative orientation information relative to the sound source object. As a result, users could not experience the realistic virtual environment. According to various embodiments of the present disclosure, sound effect processing is performed on the sound output according to the user's relative orientation information with respect to the sound source object in the virtual environment. Therefore, the user may feel as if sound is emitted directly from a sound source object, and a more realistic virtual environment may be provided. According to the technical solution of the embodiments of the present disclosure, the immersive experience of the user is effectively improved.

It should be understood that the various forms of processes shown above may be used to resort, add or delete steps. For example, the steps described in the present disclosure may be performed in parallel, sequentially, or in a different order. As long as the desired result of the technical solution disclosed in the present disclosure can be achieved, no limitation is made herein.

The above implementations do not constitute a limitation to the scope of protection of the present disclosure. It should be appreciated by those skilled in the art that various modifications, combinations, sub-combinations and substitutions may be made depending on design requirements and other factors. Any modifications, equivalents and replacements, and improvements falling within the spirit and the principle of the present disclosure should be included within the scope of protection of the present disclosure.

What is claimed is:

1. A method for processing a sound effect, comprising:
   obtaining relative orientation information of a first electronic device worn by a first user relative to at least one sound source object in a preset virtual environment, the relative orientation information comprising a relative position of the first electronic device relative to the at least one sound source object and a facing direction of the at least one sound source object, the at least one sound source object being a physically separate device from the first electronic device;
   obtaining a processed sound source signal by performing sound effect processing on a sound source signal of the at least one sound source object based on the relative orientation information; and
   providing the processed sound source signal to the first user through the first electronic device,
   wherein the performing sound effect processing comprises:
      updating the relative orientation information in response to a physical change in the facing direction of the at least one sound source object from a first facing direction to a second facing direction, and
      performing sound effect processing on the sound source signal of the at least one sound source object based on the updated relative orientation information corresponding to the second facing direction of the at least one sound source object.

2. The method of claim 1,
   wherein the performing sound effect processing further comprises:
      updating the relative orientation information in response to a change in the relative position; and
      performing sound effect processing on the sound source signal of the at least one sound source object based on the updated relative orientation information.

3. The method of claim 1, wherein the sound source signal of the at least one sound source object corresponds to the relative orientation information; and
   wherein the performing sound effect processing comprises:
      calculating a convolution of a head-related unit impulse response (EMIR) corresponding to the relative orientation information and the sound source signal of the sound source object corresponding to the relative orientation information.

4. The method of claim 1, wherein the preset virtual environment comprises a plurality of sound source objects, and
   wherein the performing sound effect processing comprises:
      performing sound effect processing on a sound source signal of each of the plurality of sound source objects based on the relative orientation information, thereby generating a processed sound source signal of each of the plurality of sound source objects; and
      superimposing the processed sound source signal of each of the plurality of sound source objects.

5. The method of claim 1, wherein the sound source object comprises a second electronic device worn by a second user, and
   wherein the obtaining relative orientation information comprises obtaining relative orientation information of the first electronic device relative to the second electronic device satisfying a preset condition in the preset virtual environment.

6. The method of claim 5, wherein the preset condition comprises a facing direction of the second electronic device facing towards the first electronic device.

7. An apparatus for processing a sound effect, comprising:
an acquiring module configured to obtain relative orientation information relative to at least one sound source object in a preset virtual environment, the relative orientation information comprising a relative position of the apparatus relative to the at least one sound source object and a facing direction of the at least one sound source object, the at least one sound source object being a physically separate device from the apparatus;
a processing module configured to obtain a processed sound source signal by performing sound effect processing on a sound source signal of the at least one sound source object based on the relative orientation information; and
a providing module configured to provide the processed sound source signal to a first user wearing the apparatus,
wherein the performing sound effect processing comprises:
updating the relative orientation information in response to a physical change in the facing direction of the at least one sound source object from a first facing direction to a second facing direction, and
performing sound effect processing on the sound source signal of the at least one sound source object based on the updated relative orientation information corresponding to the second facing direction of the at least one sound source object.

8. The apparatus of claim 7,
wherein the processing module is further configured to:
update the relative orientation information in response to a change in the relative position; and
perform sound effect processing on the sound source signal of the at least one sound source object based on the updated relative orientation information.

9. The apparatus of claim 7, wherein the sound source signal of the at least one sound source object corresponds to the relative orientation information, and
wherein the processing module is further configured to:
calculate a convolution of a head-related unit impulse response (EMIR) corresponding to the relative orientation information and the sound source signal of the sound source object corresponding to the relative orientation information.

10. The apparatus of claim 7, wherein the preset virtual environment comprises a plurality of sound source objects, and
wherein the processing module is further configured to:
perform sound effect processing on a sound source signal of each of the plurality of sound source objects based on the relative orientation information, thereby generating a processed sound source signal of each of the plurality of sound source objects; and
superimpose the processed sound source signal of each of the plurality of sound source objects.

11. The apparatus of claim 7, wherein the sound source object comprises an electronic device worn by a second user in the preset virtual environment, and
wherein the acquiring module is further configured to obtain relative orientation information of the apparatus relative to the electronic device satisfying a preset condition in the preset virtual environment.

12. The apparatus of claim 11, wherein the preset condition comprises a facing direction of the electronic device facing towards the apparatus.

13. A computing device, comprising:
at least one processor; and
a memory storing instructions that, when executed, cause the at least one processor to:
obtain relative orientation information of a first electronic device worn by a first user relative to at least one sound source object in a preset virtual environment, the relative orientation information comprising a relative position of the first electronic device relative to the at least one sound source object and a facing direction of the at least one sound source object, the at least one sound source object being a physically separate device from the first electronic device;
obtain a processed sound source signal by performing sound effect processing on a sound source signal of the at least one sound source object based on the relative orientation information; and
provide the processed sound source signal to the first user through the first electronic device,
wherein the performing sound effect processing comprises:
updating the relative orientation information in response to a physical change in the facing direction of the at least one sound source object from a first facing direction to a second facing direction, and
performing sound effect processing on the sound source signal of the at least one sound source object based on the updated relative orientation information corresponding to the second facing direction of the at least one sound source object.

14. The computing device of claim 13, further comprising:
an inputter; and
a transceiver,
wherein the instructions, when executed, further cause the at least one processor to:
obtain, through the transceiver, orientation information of the first electronic device worn the first user and orientation information of the at least one sound source object,
obtain, through the inputter, the sound source signal from the at least one sound source object,
obtain the relative orientation information of the first electronic device relative to the at least one sound source object, based on the orientation information of the at least one sound source object and the orientation information of the first electronic device, and
transmit, through the transceiver, the processed sound source signal to the first electronic device.

15. The computing device of claim 13,
wherein the instructions, when executed, further cause the at least one processor to:
update the relative orientation information in response to a change in the relative position; and
perform sound effect processing on the sound source signal of the at least one sound source object, based on the updated relative orientation information.

16. The computing device of claim 13, wherein the sound signal of the at least one sound source object corresponds to the relative orientation information, and
wherein the instructions, when executed, further cause the at least one processor to calculate a convolution of a head-related unit impulse response (EMIR) corresponding to the relative orientation information and the sound source signal of the sound source object corresponding to the relative orientation information.

17. The computing device of claim 13, wherein the preset virtual environment comprises a plurality of sound source objects, and
   wherein the instructions, when executed, further cause the at least one processor to:
   perform sound effect processing on a sound source signal of each of the plurality of sound source objects based on the relative orientation information, thereby generating a processed sound source signal of each of the plurality of sound source objects; and
   superimpose the processed sound source signal of each of the plurality of sound source objects.

18. The computing device of claim 13, wherein the sound source object comprises a second electronic device worn by a second user, and
   wherein the instructions, when executed, further cause the at least one processor to obtain relative orientation information of the first electronic device relative to the second electronic device satisfying a preset condition in the preset virtual environment.

19. The computing device of claim 18, wherein the preset condition comprises a facing direction of the second electronic device facing towards the first electronic device.

* * * * *